United States Patent
Li et al.

(10) Patent No.: US 9,874,762 B2
(45) Date of Patent: Jan. 23, 2018

(54) ELECTROCHROMIC GRATING, DISPLAY PANEL AND DISPLAY DEVICE

(71) Applicants: Boe Technology Group Co., Ltd., Beijing (CN); Beijing Boe Optoelectronics Technology Co., Ltd., Beijing (CN)

(72) Inventors: Changfeng Li, Beijing (CN); Xue Dong, Beijing (CN); Haisheng Wang, Beijing (CN); Xiaochuan Chen, Beijing (CN); Wenqing Zhao, Beijing (CN); Yingming Liu, Beijing (CN); Shengji Yang, Beijing (CN); Ming Yang, Beijing (CN); Mubing Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 17 days.

(21) Appl. No.: 14/906,480

(22) PCT Filed: Aug. 13, 2015

(86) PCT No.: PCT/CN2015/086867
§ 371 (c)(1),
(2) Date: Jan. 20, 2016

(87) PCT Pub. No.: WO2016/123955
PCT Pub. Date: Aug. 11, 2016

(65) Prior Publication Data
US 2016/0377876 A1 Dec. 29, 2016

(30) Foreign Application Priority Data

Feb. 6, 2015 (CN) .......................... 2015 1 0064931

(51) Int. Cl.
G02F 1/153 (2006.01)
G02B 27/22 (2006.01)
(Continued)

(52) U.S. Cl.
CPC ......... *G02B 27/2214* (2013.01); *G02F 1/153* (2013.01); *G02F 1/155* (2013.01);
(Continued)

(58) Field of Classification Search
CPC ..... G02B 27/2214; G02B 5/201; G02F 1/153; G02F 1/155; G02F 2201/16; G02F 2201/30
(Continued)

(56) References Cited

U.S. PATENT DOCUMENTS 4,433,901 A 2/1984 Takahashi et al.
6,498,358 B1 12/2002 Lach et al.
(Continued)

FOREIGN PATENT DOCUMENTS

CN 1375075 10/2002
CN 101960373 1/2011
(Continued)

OTHER PUBLICATIONS

Office Action from China Application No. 201510064931.2 dated Dec. 5, 2016.
(Continued)

*Primary Examiner* — Thomas K Pham
*Assistant Examiner* — Vipin Patel
(74) *Attorney, Agent, or Firm* — Calfee, Halter & Griswold LLP

(57) ABSTRACT

The embodiments of the present invention discloses an electrochromic grating, a display panel and a display device. The electrochromic grating comprises: a cathode, a first (Continued)

electrochromic layer, an ion transport layer, a second electrochromic layer and an anode arranged in a stack: Under an effect of a same electric field, materials of the first electrochromic layer and the second electrochromic layer have contrary light transmission properties in an oxidation state: and the materials of the first electrochromic layer and the second electrochromic layer have contrary light transmission properties in a reduction state That is the material of the first electrochromic layer in the oxidation state is a dark state, and the material of the second electrochromic layer in the reduction state is a dark state. Or the material of the first electrochromic layer in the reduction state is a dark state, and the material of the second electrochromic layer in the oxidation state is a dark state. Since the first electrochromic layer and the second electrochromic layer can be in dark state simultaneously when the materials of the first electrochromic layer and the second electrochromic layer are in the oxidation state and the reduction state respectively, the electrochromic grating can achieve a ultra-low transmittance, so as to further realize a higher contrast and improve the display effect.

14 Claims, 1 Drawing Sheet

(51) Int. Cl.
G02F 1/155 (2006.01)
G02B 5/20 (2006.01)

(52) U.S. Cl.
CPC .......... *G02B 5/201* (2013.01); *G02F 2201/16* (2013.01); *G02F 2201/30* (2013.01)

(58) Field of Classification Search
USPC .................................................. 359/265–275
See application file for complete search history.

(56) References Cited

U.S. PATENT DOCUMENTS 8,115,985 B2 * 2/2012 Liu .................... G02B 27/2214
359/273
2012/0120476 A1 * 5/2012 Yeh ........................ G02B 27/22
359/270

FOREIGN PATENT DOCUMENTS

| CN | 102338960 | 2/2012 |
| CN | 102455559 | 5/2012 |
| CN | 102629607 | 8/2012 |
| CN | 103246072 | 8/2013 |
| CN | 104570536 | 4/2015 |
| TW | 201219949 | 5/2012 |

OTHER PUBLICATIONS

International Search Report and Written Opinion from PCT/CN15/86867 dated Nov. 10, 2015.
Second Office Action for China Application No. 201510064931.2 dated Apr. 19, 2017.

* cited by examiner

US 9,874,762 B2

ELECTROCHROMIC GRATING, DISPLAY PANEL AND DISPLAY DEVICE

RELATED APPLICATIONS

The present application is the U.S. national phase entry of PCT/CN2015/086867, with an international filing date of Aug. 13, 2015, which claims the benefit of Chinese Patent Application No. 201510064931.2, filed on Feb. 6, 2015, the entire disclosures of which are incorporated herein by reference.

FIELD OF THE INVENTION

The present invention relates to the field of display technology, particularly to an electrochromic grating, a display panel and a display device.

BACKGROUND OF THE INVENTION

The 3D display has become a trend in the field of display owing to its verisimilitude, and is becoming part of people's life gradually. At present, the 3D technology can be classified into naked-eye type and glasses type. The glasses type 3D technology requires wearing special glasses, which is inconvenient for carry; hence, the tablet computer and mobile phone products pay more attention to the naked-eye 3D technology. The current naked-eye 3D technology mainly comprises two modes: electrochromic grating mode and cylindrical lens mode. The cylindrical lens mode is generally incompatible with the liquid crystal display panel or the organic electroluminescent display panel, so the panel manufacturer focuses more on utilizing the electrochromic grating mode to realize naked-eye 3D technology.

At present, the basic structure of the electrochromic grating is generally a five-layer structure, comprising: a first transparent electrode, an electrochromic layer, an ion transport layer, an ion storage layer and a second transparent electrode; wherein the materials of the ion storage layer are some electrochromic materials with a weak ability of color change. Although the electrochromic grating has the characteristics of simple manufacturing process, quick response of color change, and long cycle life etc., in actual applications, the electrochromic grating is easily restrained by the actual conditions such as the bright state being not bright enough and the dark state being not dark enough, such that the contrast of the generated picture is not high, and problems such as crosstalk may occur.

Therefore, how to enable the electrochromic grating to realize ultra-low transmittance in the dark state so as to further realize a higher contrast and improve the display effect is a technical problem that needs to be solved by the skilled person in the art urgently.

SUMMARY OF THE INVENTION

The embodiments of the present invention provide an electrochromic grating, a display panel and a display device, which enable the electrochromic grating to realize ultra-low transmittance in the dark state so as to further realize a higher contrast and improve the display effect.

Therefore, an embodiment of the present invention provides an electrochromic grating, comprising: a cathode, a first electrochromic layer, an ion transport layer, a second electrochromic layer and an anode arranged in a stack; wherein, under an effect of a same electric field, materials of the first electrochromic layer and the second electrochromic layer have contrary light transmission properties in an oxidation state; and the materials of the first electrochromic layer and the second electrochromic layer have contrary light transmission properties in a reduction state.

In a possible implementation, in the above electrochromic grating provided by the embodiment of the present invention, the material of the first electrochromic layer is one of an anode electrochromic material and a cathode electrochromic material, the material of the second electrochromic layer is the other of the anode electrochromic material and the cathode electrochromic material.

In a possible implementation, in the above electrochromic grating provided by the embodiment of the present invention, the material of the first electrochromic layer is the anode electrochromic material, the material of the second electrochromic layer is the cathode electrochromic material, and when no voltage is applied to the cathode and the anode, the electrochromic grating presents a grating structure.

In a possible implementation, in the above electrochromic grating provided by the embodiment of the present invention, the material of the first electrochromic layer is the cathode electrochromic material, the material of the second electrochromic layer is the anode electrochromic material, and when a voltage is applied to the cathode and the anode, the electrochromic grating presents a grating structure.

In a possible implementation, in the above electrochromic grating provided by the embodiment of the present invention, the anode electrochromic material is one of $NiO_X$, $IrO_X$, $CoO_X$, $RhO_X$ or a combination thereof.

In a possible implementation, in the above electrochromic grating provided by the embodiment of the present invention, the cathode electrochromic material is one of $WO_3$, $MoO_3$, $TiO_2$, $V_2O_5$, $Nb_2O_5$ or a combination thereof.

The embodiment of the present invention further provides a display panel, comprising a plurality of electrochromic gratings provided by one of the above embodiments of the present invention, wherein intervals are arranged between adjacent electrochromic gratings.

In a possible implementation, in the above display panel provided by the embodiment of the present invention, it further comprises: a counter substrate and an array substrate arranged oppositely, the plurality of electrochromic gratings are located at one side of the counter substrate away from the array substrate or located at one side of the counter substrate facing the array substrate.

In a possible implementation, in the above display panel provided by the embodiment of the present invention, the counter substrate comprises a base substrate and a color filter layer; the base substrate is arranged at one side of the counter substrate away from the array substrate, the color filter layer is arranged at one side of the counter substrate facing the array substrate; the plurality of electrochromic gratings are arranged between the base substrate and the color filter layer.

In a possible implementation, in the above display panel provided by the embodiment of the present invention, a planarization layer is further arranged between the color filter layer and the plurality of electrochromic gratings.

The embodiment of the present invention further provides a display device comprising the above display panel provided by the embodiment of the present invention.

The beneficial effect of the present invention is as follows:

The embodiment of the present invention provides an electrochromic grating, a display panel and a display device, the electrochromic grating comprising: a cathode, a first electrochromic layer, an ion transport layer, a second electrochromic layer and an anode arranged in a stack; wherein, under an effect of a same electric field, materials of the first electrochromic layer and the second electrochromic layer have contrary light transmission properties in an oxidation state; the materials of the first electrochromic layer and the second electrochromic layer have contrary light transmission properties in a reduction state, i.e., the material of the first electrochromic layer in oxidation state is in a dark state, the material of the second electrochromic layer in reduction state is in a dark state; or, the material of the first electrochromic layer in reduction state is in a dark state, the material of the second electrochromic layer in oxidation state is in a dark state, since the first electrochromic layer and the second electrochromic layer can be in dark state simultaneously when the materials of the first electrochromic layer and the second electrochromic layer are in oxidation state and reduction state respectively, the electrochromic grating can achieve a ultra-low transmittance, so as to further realize a higher contrast and improve the display effect.

DETAILED DESCRIPTION OF THE INVENTION

Figure 1:
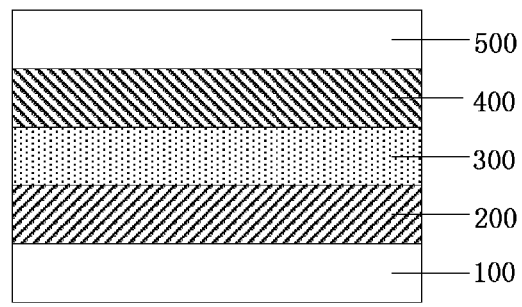
FIG. 1 is a structural schematic diagram of an electrochromic grating provided by the embodiment of the present invention.

The specific implementations of the electrochromic grating, the display panel and the display device provided by the embodiment of the present invention will be explained in detail below with reference to the drawings.

Wherein the thickness and the shape of the film layers in the drawings do not reflect the real proportion of the electrochromic grating, which only aim to explain the contents of the present invention schematically.

The embodiment of the present invention provides an electrochrmic grating, as shown in FIG. 1, comprising: a cathode 100, a first electrochromic layer 200, an ion transport layer 300, a second electrochromic layer 400 and an anode 500 arranged in a stack; wherein, under an effect of a same electric field, materials of the first electrochromic layer 200 and the second electrochromic layer 400 have contrary light transmission properties in oxidation state; the materials of the first electrochromic layer 200 and the second electrochromic layer 400 have contrary light transmission properties in reduction state.

In the above electrochromic grating provided by the embodiment of the present invention, under the effect of the same electric field, the materials of the first electrochromic layer and the second electrochromic layer contained in the electrochromic grating have contrary light transmission properties in oxidation state; the materials of the first electrochromic layer and the second electrochromic layer have contrary light transmission properties in reduction state, i.e., the material of the first electrochromic layer in oxidation state is in a dark state, the material of the second electrochromic layer in reduction state is in a dark state; or, the material of the first electrochromic layer in reduction state is in a dark state, the material of the second electrochromic layer in oxidation state is in a dark state, since the first electrochromic layer and the second electrochromic layer can be in dark state simultaneously when the materials of the first electrochromic layer and the second electrochromic layer are in oxidation state and reduction state respectively, the electrochromic grating can achieve a ultra-low transmittance, so as to further realize a higher contrast and improve the display effect.

In a specific implementation, in the above electrochromic grating provided by the embodiment of the present invention, according to the different color changing principles of the electrochromic materials, the electrochromic materials can be classified into anode electrochromic material and cathode electrochromic material. The anode electrochromic material and the cathode electrochromic material have contrary light transmission properties in oxidation state or reduction state under the same electric field, thereby being capable of enabling the materials of the first electrochromic layer and the second electrochromic layer to have contrary light transmission properties in oxidation state under the same electric field; the materials of the first electrochromic layer and the second electrochromic layer to have contrary light transmission properties in reduction state, and in different states of gaining electrons and losing electrons. The material of the first electrochromic layer is one of the anode electrochromic material and the cathode electrochromic material, the material of the second electrochromic layer is the other of the anode electrochromic material and the cathode electrochromic material. The material of the first electrochromic layer differs from the material of the second electrochromic layer, i.e.: when the material of the first electrochromic layer is the anode electrochromic material, the material of the second electrochromic layer is the cathode electrochromic material; or, when the material of the first electrochromic layer is the cathode electrochromic material, the material of the second electrochromic layer is the anode electrochromic material.

In a specific implementation, the materials of the first electrochromic layer and the second electrochromic layer can be designed specifically based on actual needs, in the above electrochromic grating provided by the embodiment of the present invention, it may specifically comprise the following two implementations:

Specifically, in a first implementation, in the above electrochromic grating provided by the embodiment of the present invention, the material of the first electrochromic layer is the anode electrochromic material, the material of the second electrochromic layer is the cathode electrochromic to material; i.e., the anode electrochromic material is arranged at one side of the cathode facing the anode, the cathode electrochromic material is arranged at one side of the anode facing the cathode. When a voltage is applied to the cathode and the anode, the material of the first electrochromic layer, i.e., the anode electrochromic material has electrons, in a low valence state (reduction state), and it is in a transparent state; the material of the second electrochromic layer, i.e., the cathode electrochromic material has no electrons, in a high valence state (oxidation state), and it is in a transparent state; when no voltage is applied to the cathode and the anode, the material of the first electrochromic layer, i.e., the anode electrochromic material will lose electrons, an oxidation reaction occurs, thereby the color change behavior occurs, and a dark state is formed; the material of the second electrochromic layer, i.e., the cathode electrochromic material will get the electrons, a reduction action occurs, thereby the color change behavior occurs, and a dark state is formed, such that the electrochromic grating presents a grating structure, and achieves a ultra-low transmittance, so as to further realize a higher contrast and improve the display effect.

Specifically, in a second implementation, in the above electrochromic grating provided by the embodiment of the present invention, the material of the first electrochromic layer is the cathode electrochromic material, the material of the second electrochromic layer is the anode electrochromic material, i.e., the cathode electrochromic material is arranged at one side of the cathode facing the anode, the anode electrochromic material is arranged at one side of the anode facing the cathode. When no voltage is applied to the cathode and the anode, the material of the first electrochromic layer, i.e., the cathode electrochromic material has no electrons, in a high valence state (oxidation state), and it is in a transparent state, the material of the second electrochromic layer, i.e., the anode electrochromic material has electrons, in a low valence state (reduction state), and it is in a transparent state; when a voltage is applied to the cathode and the anode, the material of the first electrochromic layer, i.e., the cathode electrochromic material will get the electrons, a reduction reaction occurs, thereby the color change behavior occurs, and a dark state is formed; the material of the second electrochromic layer, i.e., the anode electrochromic material will lose electrons, an oxidation action occurs, thereby the color change behavior occurs, and a dark state is formed, such that the electrochromic grating presents a grating structure, and achieves a ultra-low transmittance, so as to further realize a higher contrast and improve the display effect.

In the above two implementations, the first implementation can achieve the effect of a lower transmittance in the dark state at zero potential, so as to further achieve a higher contrast and improve the display effect; while the second implementation can achieve a lower transmittance in the dark state at a certain potential, so as to further achieve a higher contrast and improve the display effect; in a specific implementation, it can be designed based on actual needs which implementation is to be used specifically, so it will not be limited here.

In a specific implementation, in the above electrochromic grating provided by the embodiment of the present invention, the anode electrochromic material has various selections, the anode electrochromic material can be one of $NiO_X$, $IrO_X$, $CoO_X$, $RhO_X$ or a combination thereof, in this context, according to the color change principle of the cathode electrochromic material, as shown in Table 1 below, selecting the material of the above anode electrochromic material reasonably can further achieve the effect of a lower transmittance in the dark state, the specific selection of the anode electrochromic material will not be limited here.

It is listed in Table 1 below the color change principle and color change of the anode electrochromic materials.

TABLE 1

| Anode electrochromic material | Color change principle | Color change |
|---|---|---|
| $NiO_X$ | $MO_y + xB - xe = B_xMO_y$ | colorless-black brown |
| $IrO_X$ | B is an ion, M is a metal | colorless-blue black |
| $CoO_X$ | element | red-blue |
| $RhO_X$ | | yellow-dark green |

In a specific implementation, in the above electrochromic grating provided by the embodiment of the present invention, the cathode electrochromic material has various selections, the cathode electrochromic material can be one of $WO_3$, $MoO_3$, $TiO_2$, $V_2O_5$, $Nb_2O_5$ or a combination thereof, in this context, according to the color change principle of the cathode electrochromic material, as shown in Table 2 below, selecting the material of the above cathode electrochromic material reasonably can further achieve the effect of a lower transmittance in the dark state, the specific selection of the cathode electrochromic material will not be limited here.

It is listed in Table 2 below the color change principle and color change of the cathode electrochromic materials.

TABLE 2

| Cathode electrochromic material | Color change principle | Color change |
|---|---|---|
| $WO_3$ | $MO_y + xA + xe = A_xMO_y$ | colorless-blue |
| $MoO_3$ | A is an ion, M is a metal element | colorless-dark blue/black |
| $TiO_2$ | | colorless-light blue |
| $V_2O_5$ | | yellow-blue |
| $Nb_2O_5$ | | colorless-light blue |

Figure 2:
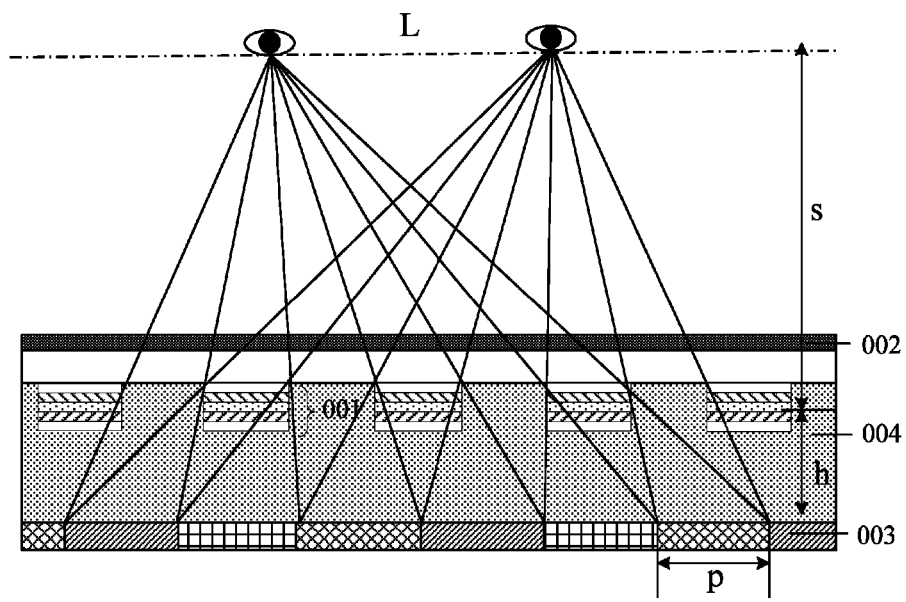
FIG. 2 is a principle diagram of a grating type 3D display panel provided by the embodiment of the present invention.

Based on the same inventive concept, the embodiment of the present invention further provides a display panel comprising a plurality of electrochromic gratings stated in one of the above embodiments, wherein intervals are arranged between adjacent electrochromic gratings (as shown in FIG. 2). Since the principle of the display panel for solving problems is similar as the preceding electrochromic grating, the implementation of the display panel can make reference to the implementation of the electrochromic grating, which will not be repeated here.

In a specific implementation, in the display panel provided by the embodiment of the present invention, it can further comprise: a counter substrate and an array substrate arranged oppositely (not shown in FIG. 2), the plurality of electrochromic gratings are located at one side of the counter substrate away from the array substrate or located at one side of the counter substrate facing the array substrate.

In a specific implementation, in the display panel provided by the embodiment of the present invention, as shown in FIG. 2, the counter substrate comprises a base substrate 002 and a color filter layer 003; the base substrate 002 is arranged at one side of the counter substrate away from the array substrate, the color filter layer 003 is arranged at one side of the counter substrate facing the array substrate; when the plurality of electrochromic gratings 001 are located at one side of the counter substrate facing the array substrate, the plurality of electrochromic gratings 001 can be arranged between the base substrate 002 and the color filter layer 003, thus the film(s) can be formed at the same side of the base substrate 002 directly, so as to manufacture the plurality of electrochromic gratings 001 and the color filter layer 003 etc.; compared with manufacturing the plurality of electrochromic gratings 001 and the color filter layer 003 at two sides of the base substrate 002 respectively, the process is relatively simple, and the cost is reduced; meanwhile, compared with manufacturing the plurality of electrochromic gratings 001 and the color filter layer 003 at two sides of the base substrate 002 respectively, when manufacturing the plurality of electrochromic gratings 001 and the color filter layer 003 at the same side of the base substrate 002, the plurality of electrochromic gratings 001 is relatively close to the color filter layer 003, the resolution of the display panel can be increased as much as possible while maintaining certain ideal viewing distance, so as to realize a high resolution display picture.

Specifically, it needs to be noted that the light at particular angles is limited by whole columns of opaque material, so that the left eye can only see the image that needs to be seen by the left eye, the right eye can only see the image that needs to be seen by the right eye, thereby generating a 3D image; however, such a structure may cause the resolution of the 3D image to be reduced; hence, it is necessary to increase the resolution of the display panel as much as possible.

As shown in FIG. 2, a formula can be obtained:

$$\frac{s}{h} = \frac{L}{p}.$$

Wherein S is an optimal viewing distance, the value of which is generally 350-400 mm; L is the sight distance of two eyes, the value of which is generally 65 mm; h is the distance between the electrochromic grating and the color filter layer, and p is the width of the sub-pixel area.

Specifically, in the case that the optimal viewing distance and the sight distance are unchanged, it can be seen from the above formula that the smaller the value of h is, the smaller the value of p will be, in other words, the resolution of the display panel will be higher. Hence, when the electrochromic grating 001 is located at one side of the counter substrate away from the array substrate, i.e., the display panel is an external electrochromic grating 3D display panel, the distance h between the electrochromic grating and the color filter layer will be relatively large, the quality of the 3D display picture cannot be improved as much as possible. Thus it can be seen that reducing the value of h as much as possible is the key of realizing high quality 3D picture, when the electrochromic grating 001 is arranged between the base substrate 002 and the color filter layer 003, the resolution of the display panel can be increased as much as possible while maintaining certain ideal viewing distance, so as to realize a high resolution display picture.

In a specific implementation, in the display panel provided by the embodiment of the present invention, as shown in FIG. 2, a planarization layer 004 can be further arranged between the color filter layer 003 and the plurality of electrochromic gratings 001, the material of the planarization layer 004 can be OC resin, which can make the contact surface of the color filter layer 003 and the plurality of electrochromic gratings 001 flat.

Specifically, in a specific implementation, as shown in FIG. 2, the upper and lower positional relation between the anode and the cathode contained in each electrochromic grating 001 is not limited, it can be either the anode in direct contact with the base substrate 002 or the cathode in direct contact with the base substrate 002. Moreover, in the display panel, the anodes or the cathodes contained in all the electrochromic gratings 001 (FIG. 2 shows six electrochromic gratings 001) can be continuous layers, and can also be arranged as strips according to the area where each electrochromic grating 001 is located, which will not be limited here.

In a specific implementation, the display panel provided by the embodiment of the present invention may generally also have other film layer structures, and structures such as thin film transistors, gate lines, data lines can also be formed on the base substrate; these specific structures may have various implementations, which will not be limited here.

Based on the same inventive concept, the embodiment of the present invention further provides a display device comprising the above display panel provided by the embodiment of the present invention, the display device may be any product or component with the display function such as: a mobile phone, a tablet computer, a television, a display, a laptop, a digital photo frame, a navigator, etc. Other essential components of the display device should all be possessed as understood by the ordinary skilled person in the art, which will not be repeated here, and should not be taken as limitations to the present invention either. The implementation of the display device can make reference to the embodiments of the above display panel, which will not be repeated here.

The embodiment of the present invention provides an electrochromic grating, a display panel and a display device, the electrochromic grating comprising: a cathode, a first electrochromic layer, an ion transport layer, a second electrochromic layer and an anode arranged in a stack; wherein, under an effect of a same electric field, materials of the first electrochromic layer and the second electrochromic layer have contrary light transmission properties in oxidation state; the materials of the first electrochromic layer and the second electrochromic layer have contrary light transmission properties in reduction state, i.e., the material of the first electrochromic layer in oxidation state is in a dark state, the material of the second electrochromic layer in reduction state is in a dark state; or, the material of the first electrochromic layer in reduction state is in a dark state, the material of the second electrochromic layer in oxidation state is in a dark state, since the first electrochromic layer and the second electrochromic layer can be in dark state simultaneously when the materials of the first electrochromic layer and the second electrochromic layer are in oxidation state and reduction state respectively, the electrochromic grating can achieve a ultra-low transmittance, so as to further realize a higher contrast and improve the display effect.

Apparently, the skilled person in the art can make various modifications and variations to the present invention without departing from the spirit and scope of the present invention. In this way, provided that these modifications and variations of the present invention belong to the scopes of the claims of the present invention and the equivalent technologies thereof, the present invention also intends to cover these modifications and variations.

The invention claimed is:

1. A display panel comprising a plurality of electrochromic gratings and intervals arranged between adjacent electrochromic gratings, a counter substrate and an array substrate arranged oppositely, the plurality of electrochromic gratings being located at one side of the counter substrate away from the array substrate or located at one side of the counter substrate facing the array substrate;

wherein the counter substrate comprises a base substrate and a color filter layer; the base substrate is arranged at one side of the counter substrate away from the array substrate, the color filter layer is arranged at one side of the counter substrate facing the array substrate; the plurality of electrochromic gratings are arranged between the base substrate and the color filter layer;

wherein each electrochromic grating comprises a cathode, a first electrochromic layer, an ion transport layer, a second electrochromic layer, and an anode arranged in a stack;

and wherein under an effect of a same electric field, materials of the first electrochromic layer and the second electrochromic layer have contrary light transmission properties in an oxidation state; and the materials of the first electrochromic layer and the second electrochromic layer have contrary light transmission properties in a reduction state.

2. The display panel as claimed in claim 1, wherein the material of the first electrochromic layer is one of an anode electrochromic material and a cathode electrochromic material, the material of the second electrochromic layer is the other of the anode electrochromic material and the cathode electrochromic material.

3. The display panel as claimed in claim 2, wherein the material of the first electrochromic layer is the anode electrochromic material, the material of the second electrochromic layer is the cathode electrochromic material, when no voltage is applied to the cathode and the anode, the electrochromic grating presents a grating structure.

4. The display panel as claimed in claim 2, wherein the material of the first electrochromic layer is the cathode electrochromic material, the material of the second electrochromic layer is the anode electrochromic material, when a voltage is applied to the cathode and the anode, the electrochromic grating presents a grating structure.

5. The display panel as claimed in claim 2, wherein the anode electrochromic material is one of $NiO_X$, $IrO_X$, $CoO_X$, $RhO_X$ or a combination thereof.

6. The display panel as claimed in claim 2, wherein the cathode electrochromic material is one of $WO_3$, $MoO_3$, $TiO_2$, $V_2O_5$, $Nb_2O_5$ or a combination thereof.

7. The display panel as claimed in claim 1, further comprising a planarization layer arranged between the color filter layer and the plurality of electrochromic gratings.

8. A display device comprising the display panel as claimed in claim 1.

9. The display device as claimed in claim 8, further comprising a planarization layer arranged between the color filter layer and the plurality of electrochromic gratings.

10. The display device as claimed in claim 8, wherein the material of the first electrochromic layer is one of an anode electrochromic material and a cathode electrochromic material, the material of the second electrochromic layer is the other of the anode electrochromic material and the cathode electrochromic material.

11. The display device as claimed in claim 10, wherein the material of the first electrochromic layer is the anode electrochromic material, the material of the second electrochromic layer is the cathode electrochromic material, when no voltage is applied to the cathode and the anode, the electrochromic grating presents a grating structure.

12. The display device as claimed in claim 10, wherein the material of the first electrochromic layer is the cathode electrochromic material, the material of the second electrochromic layer is the anode electrochromic material, when a voltage is applied to the cathode and the anode, the electrochromic grating presents a grating structure.

13. The display device as claimed in claim 10, wherein the anode electrochromic material is one of $NiO_X$, $IrO_X$, $CoO_X$, $RhO_X$ or a combination thereof.

14. The display device as claimed in claim 10, wherein the cathode electrochromic material is one of $WO_3$, $MoO_3$, $TiO_2$, $V_2O_5$, $Nb_2O_5$ or a combination thereof.

* * * * *